Patented Nov. 23, 1937

2,099,743

UNITED STATES PATENT OFFICE 2,099,743

WATER SOFTENER

Ellwyn C. Kroeger, Newton, Iowa, assignor to The Maytag Company, Newton, Iowa, a corporation of Delaware No Drawing. Application July 15, 1936, Serial No. 90,757

2 Claims. (Cl. 210—23)

The present invention relates to water softeners and more particularly to a novel composition and combination of ingredients for softening water.

Among the objects of the present invention is to provide a water softener which is inexpensive and efficient in its softening action on hard water. By its use in a tub of wash water prior to the addition of soap or other washing compounds, a solution is provided free from any sticky curd or the like which tends to prevent the formation of adequate lather or suds and which cannot be readily rinsed from a garment or other article being washed. By the use of a relatively small amount of the novel compound in wash water, the amount of soap or other washing compound required to be added to form the necessary suds or lather, is appreciably reduced.

A further distinct advantage in the use of the present compound in the wash water is that it has a bleaching action or effect which will to a large extent remove the gray color often found in white clothes which have been washed with the more common washing compounds or soaps.

A further object is to provide a water softener which when added to the wash water in an aluminum tub of the type now in general use, will not attack the aluminum.

A still further object of the present invention is to provide a compound which when added to hard water used in washing garments and other articles or objects, readily goes into solution and any precipitates formed thereby are light and flaky in nature and easily rinsed from the clothes or other objects.

Further objects and advantages are inherent in the novel composition and in the proportions of the ingredients, and will be readily apparent from the disclosure and claims.

In the preparation of the novel compound, sodium meta silicate and sodium carbonate are preferably intimately mixed together in a finely divided or granulated state. The proportion may be varied through a considerable range depending upon the water, as water in different localities varies as to composition and degrees of hardness. Excellent results have been obtained of all waters tested or treated by using the compound in the proportion of approximately 67% sodium meta silicate and 33% sodium carbonate. However, good results have been secured in different localities by the use of a compound composed of 50 to 85% of sodium meta silicate with 15 to 50% of sodium carbonate.

The novel compound, when a small quantity thereof is added to the wash water prior to the addition of the necessary soap or washing compound for forming suds or lather, will quickly go into solution and materially and effectively soften the water. Any precipitates formed thereby, are not sticky but of a light and flaky nature and easily rinsed from the garment or other object being washed. When used in the rinse water, this compound will prevent the formation of curd or the like. It also permits the use of water containing large amounts of iron or other minerals causing water hardness, to be used for laundry purposes.

When used in the wash water in aluminum tubs now in general use for laundry purposes, it quickly goes into solution and will not attack the aluminum. This is also true as to tubs made of other metals or materials.

Having thus disclosed the invention, I claim:

1. A water softener consisting of an intimate mixture of sodium meta silicate and sodium carbonate in approximately the relative proportions of 50 to 85% of sodium meta silicate and 15 to 50% of sodium carbonate.

2. A water softener consisting of a mixture of sodium meta silicate and sodium carbonate in approximately the proportions of 67% of sodium meta silicate and 33% of sodium carbonate.

ELLWYN C. KROEGER.